E. CRAIG.
FASTENER DRIVING MACHINE.
APPLICATION FILED JAN. 20, 1911.

1,224,280.

Patented May 1, 1917.
7 SHEETS—SHEET 1.

Witnesses:
Inventor:
Edward Craig
By Buckley & Durand
Attys.

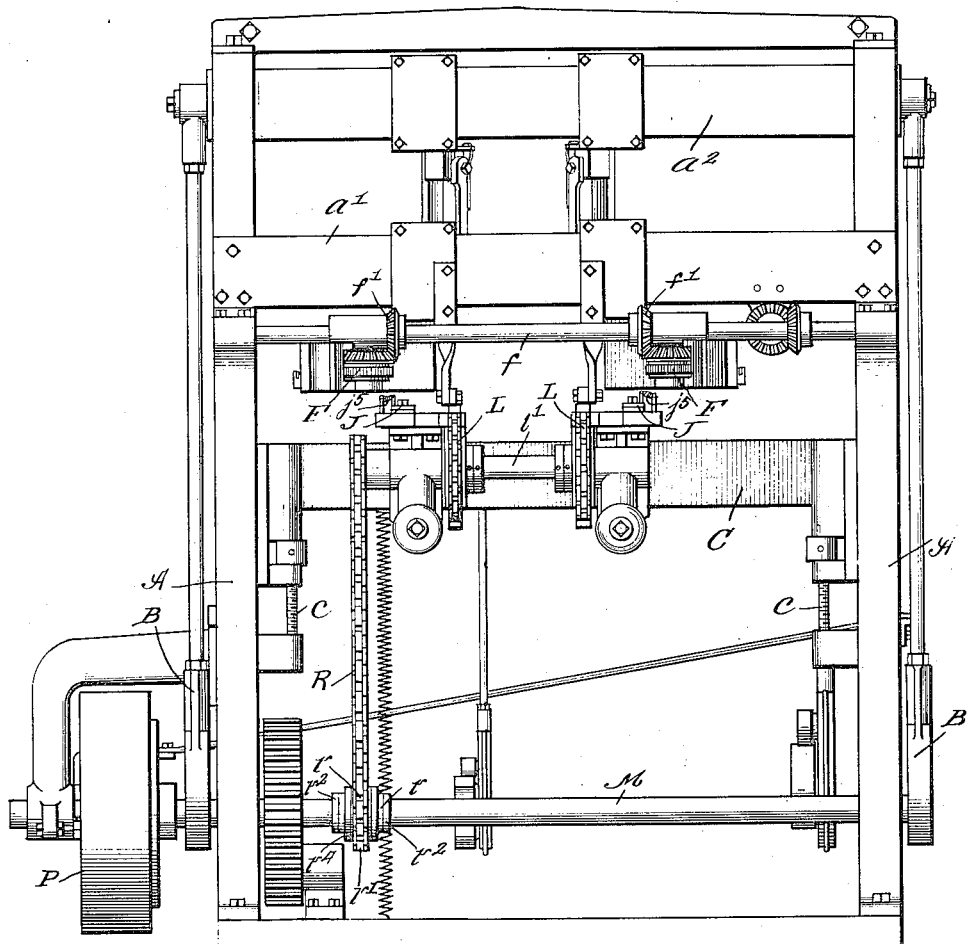

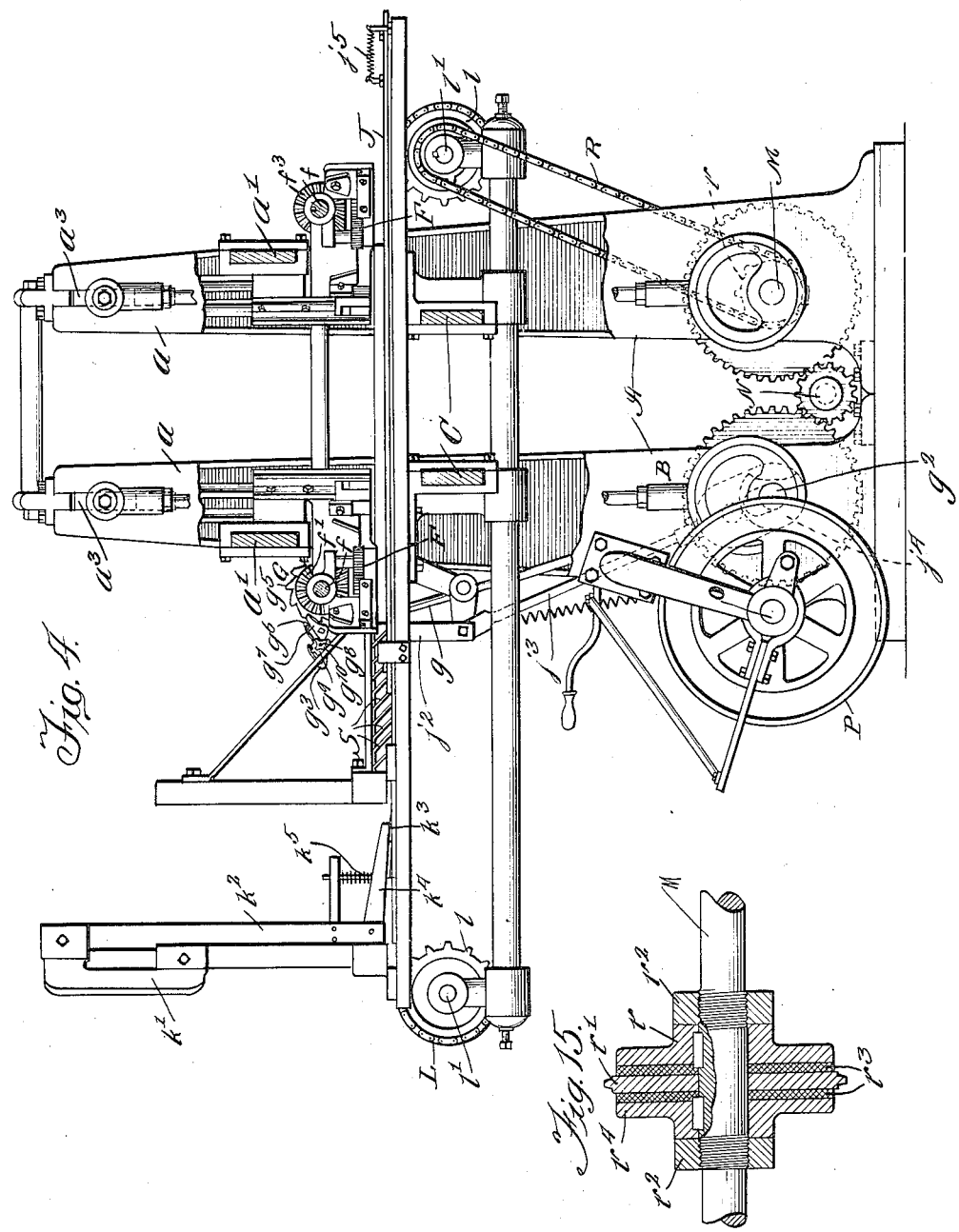

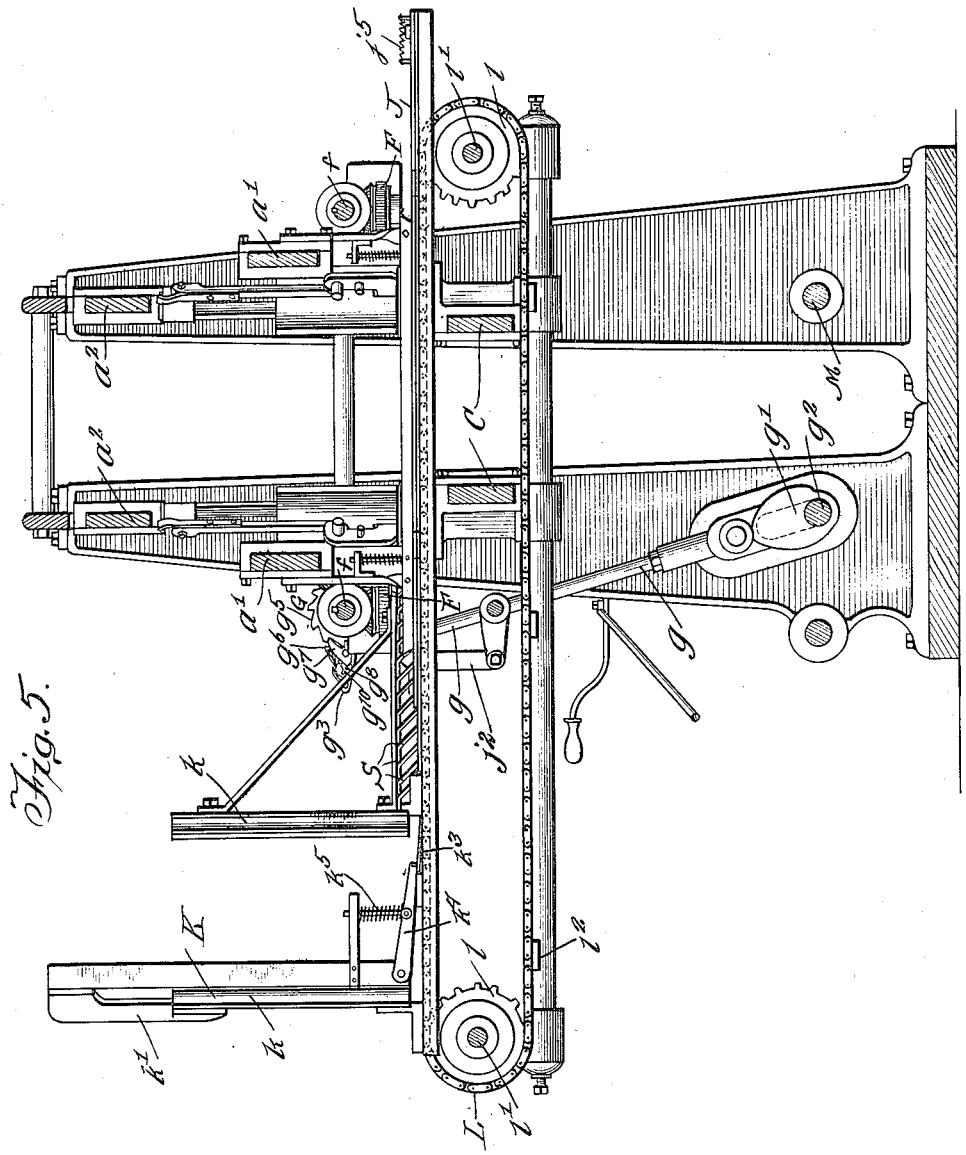

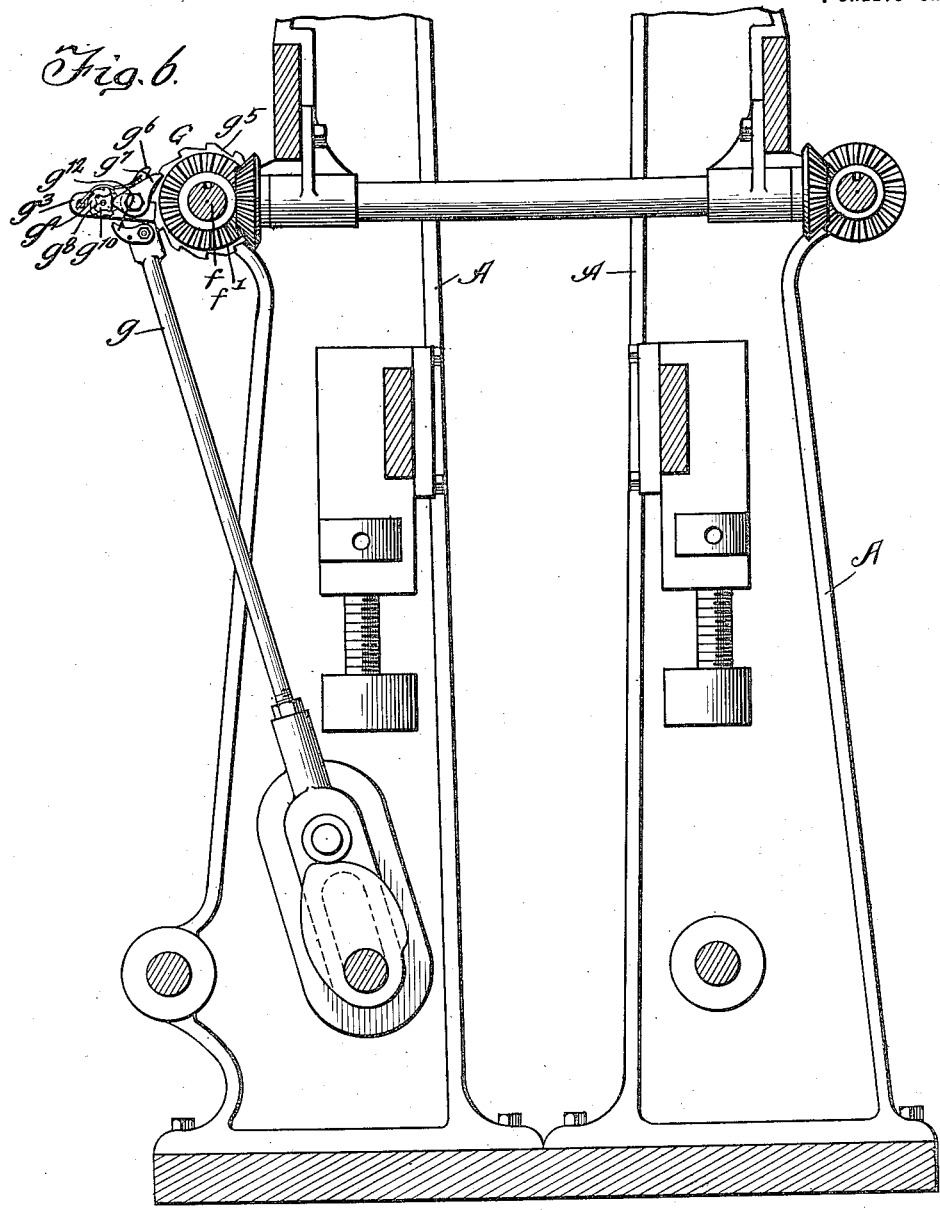

E. CRAIG.
FASTENER DRIVING MACHINE.
APPLICATION FILED JAN. 20, 1911.

1,224,280.

Patented May 1, 1917.
7 SHEETS—SHEET 6.

Witnesses:
Jas. P. Perry
E. H. Clegg

Inventor
Edward Craig
By Buckley & Durand
Attys.

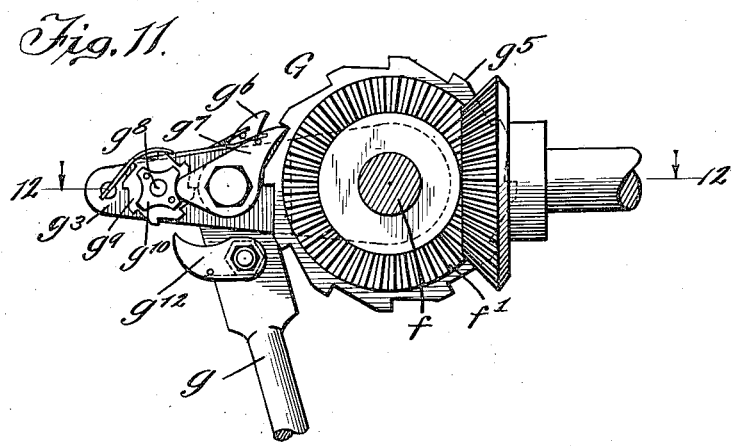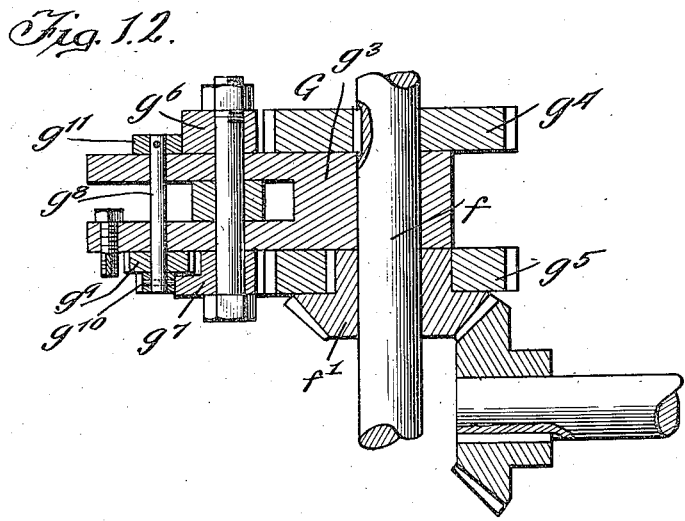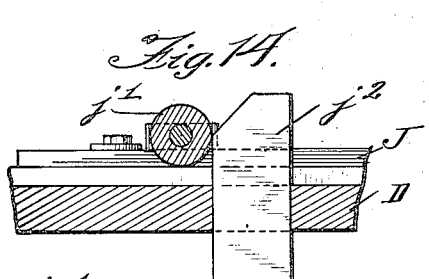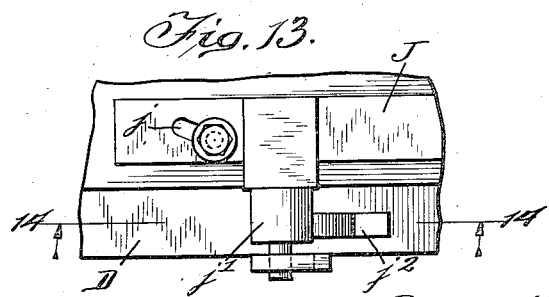

UNITED STATES PATENT OFFICE.

EDWARD CRAIG, OF ST. JOSEPH, MICHIGAN.

FASTENER-DRIVING MACHINE.

1,224,280.      Specification of Letters Patent.      Patented May 1, 1917.

Application filed January 20, 1911. Serial No. 603,631.

*To all whom it may concern:*

Be it known that I, EDWARD CRAIG, a citizen of the United States of America, and resident of St. Joseph, Berrein county, Michigan, have invented a certain new and useful Improvement in Fastener-Driving Machines, of which the following is a specification.

My invention relates to machinery for making and driving corrugated sheet-metal fasteners. It is not absolutely necessary that the machine be provided with means for making the corrugations, but it is essential that the machine be provided with means for feeding the ribbon of steel, and for cutting off lengths of the said strip or ribbon and driving the same. The corrugating, so far as the broader purposes of my invention are concerned, may be performed by means outside of the machine, without departing from the spirit of my invention. As shown, the machine is provided with feed rolls for feeding the ribbons of steel. These rolls may be of a character to corrugate the metal, or they may be employed merely for feeding an already corrugated strip of metal.

The object of my invention, generally stated, is to provide an improved machine for driving corrugated sheet-metal fasteners.

The special object is to provide a machine of this kind in which the materials are automatically assembled, and in which means are provided for automatically feeding the assembled materials to the mechanisms for driving the corrugated sheet-metal fasteners, whereby the machine is capable of first assembling the materials in proper shape or form, and of then fastening the same together by the insertion of fasteners of this kind, or of any other suitable character. In other words, and in as far as the automatic assembling of the different strips of wood or other material in a desired shape or form, and the automatic feeding of a complete set of assembled parts, is concerned, the means for fastening the said materials together may be of any suitable known or approved character, and does not comprise a mechanism for driving a corrugated sheet-metal fastener, as, for the broader purposes of my invention, a stapling mechanism may be used for securing the different parts together.

It is also an object, of course, to provide certain novel details and combinations of features of improvement tending to increase the general efficiency of a machine of this particular character.

To the foregoing and other useful ends, my invention consists in matters hereinafter set forth and claimed.

In the accompanying drawings,—

Fig. 2 is a rear elevation of the said machine;

Fig. 3 is a perspective of the frame which is the product of the said machine,—that is to say, this figure shows a rectangular frame of the kind manufactured by this machine, being composed of four strips of wood or other material secured together at each angle by the insertion of a corrugated sheet-metal fastener, as will hereinafter more fully appear;

Fig. 4 is a side elevation of the machine shown in Fig. 1, certain parts thereof being broken away to illustrate some of the interior construction;

Fig. 5 is a longitudinal section on line 5—5 in Fig. 1.

Fig. 6 is an enlarged section on line 6—6 in Fig. 1.

Fig. 7 is a perspective of one of the links employed in the endless traveling workholder, showing one of the blocks employed for automatically feeding the stock from the hopper, as will hereinafter more fully appear.

Fig. 11 is an enlarged detail sectional view of the ratchet feed mechanism.

Fig. 12 is a section on line 12—12 in Fig. 11.

Fig. 13 is a plan view of a portion of one side of the machine.

Fig. 14 is a section on line 14—14 in Fig. 13.

Fig. 15 is an enlarged sectional view of the frictional connection between the drive shaft and the traveling workholder, which permits the latter to stand still when the frames are caught and held stationary for a moment to receive the fasteners.

Figure 1:
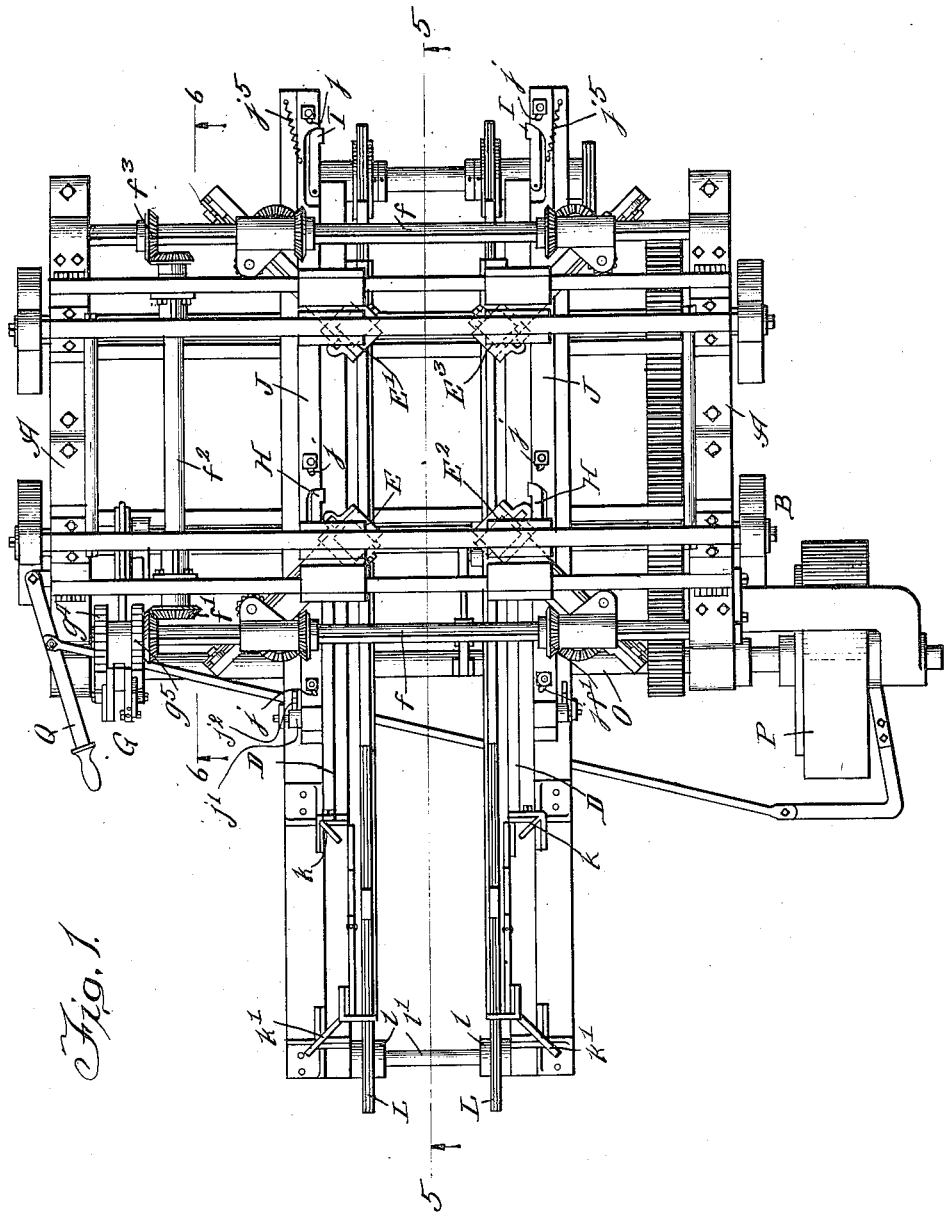
Figure 1 is a plan of a machine for driving corrugated sheet-metal fasteners, embodying the principles of my invention.
Figure 8:
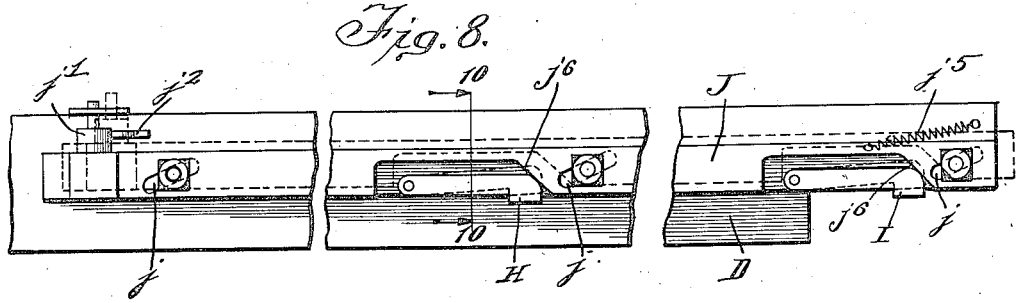
Fig. 8 is an enlarged plan view of one side portion of the machine.

As thus illustrated, my invention comprises a frame or body A consisting of upright portions $a$, which portions are rigidly connected together by transverse horizontal bars $a'$. The bars or cross heads $a^2$ move up and down in the slots or guide-ways $a^3$ provided in the said frame or body and are actuated by eccentric cams B, in the usual and well known manner. The table bars C extend transversely and horizontally of the machine, between the side members of the frame thereof, and are adjustable up and down by means of a screw $c$, whereby lumber or stock of different thicknesses can be presented to the fastener drivers. The said bars C support the parallel and longitudinal stock guides D, which receive the ends or edges of the frame shown in Fig. 3, whereby the latter are actuated in a straight course. The fastener drivers, preferably four in number, E, E', E$^2$ and E$^3$ are disposed obliquely and in a position to drive the fasteners $e$ in the corners of the said frames, which frames are made up of strips of wood which are mitered or beveled at their ends, whereby four strips go to make up a rectangular frame. It will be seen, therefore, that the said fastener drivers, which can be of any known or suitable character, are preferably arranged to drive the said fasteners obliquely, each fastener being driven crosswise of the joint at one corner of the frame. The said fastener drivers are operated by the reciprocating cross head $a^2$, and as shown are adapted to drive corrugated sheet metal fasteners of any suitable, known or approved character. There is a feed mechanism F, consisting of corrugated rolls, for each fastener driver, which feed mechanisms are driven by the transverse shafts $f$. The said feed mechanisms are splined on the said shafts, so that the size of the said frames, such as shown in Fig. 3, can be changed or varied by varying the distance between the fastener drivers, and by correspondingly varying the distance between the stock guides D, in a manner which will be readily understood. The feed mechanisms F are adapted, in any suitable manner, to feed the strips or ribbons of steel to the fastener drivers, and the shafts $f$ are operated by a ratchet mechanism G, such as that shown in Fig. 11, the said ratchet mechanism being mounted on the end of one of the shafts $f$ and connected to the other shaft through the medium of beveled gears $f'$, the shaft $f^2$ and the bevel gear $f^3$. Thus the intermittent actuation of the shaft $f$ at the front of the machine produces a like operation of the shaft $f$ at the rear end of the machine, and by the rear end I mean the place where the finished product is delivered from the machine. The ratchet mechanism G, shown in Figs. 11 and 12, is operated by a pitman $g$ connected with and actuated by a cam $g'$ on the drive shaft $g^2$ at the bottom of the machine. The said ratchet mechanism comprises a swinging or reciprocating arm $g^3$ loosely mounted on the shaft $f$ (see Figs. 11 and 12), which arm is connected to the upper end of the pitman $g$ in any suitable manner. The ratchet wheel $g^4$ is on the shaft $f$, and the ratchet wheel $g^5$ is on the beveled gearing $f'$. The arm $g^3$ carries a dog $g^6$ that engages the ratchet wheel $g^4$, and a dog $g^7$ that engages a ratchet wheel $g^5$. The arm $g^3$ carries a short shaft $g^8$ upon which is mounted a ratchet wheel $g^9$ and a pair of star wheels $g^{10}$ and $g^{11}$, the latter adapted to engage the dog $g^6$, and the former the dog $g^7$. The pitman $g$ carries a dog $g^{12}$, adapted to engage the ratchet wheel $g^9$, whereby the shaft $g^8$ is rotated intermittently. The star wheels $g^{10}$ and $g^{11}$ are set at opposite angles whereby first one and then the other of the dogs $g^6$ and $g^7$ are held out of engagement by the down stroke of the cross head by which the drivers are actuated. Thus in the operation of the machine, the fastener drivers E and E$^2$ are first actuated to drive the fasteners at the forward corners of the frame, and afterward the fastener drivers E' and E$^3$ are actuated to drive the fasteners at the rear corners of the same frame. When the fastener drivers E and E$^2$ are actuated, the skipping mechanism just described causes the fastener drivers E' and E$^3$ to skip or miss. Also, when the drivers E' and E$^3$ are driving, the skipping mechanism prevents the drivers E and E$^2$ from inserting any fasteners. In this way the stock for the fasteners can be fed in different directions—that is to say, in directions obliquely crossing the machine at a point located centrally between the different fastener drivers, which is a simple and advantageous arrangement.

The stock guides are provided with hooks H and I, the former below and to the rear of the fastener drivers E and E$^2$, and the latter below and to the rear of the fastener drivers E' and E$^3$. The hooks H catch the front corners of the frame and hold the same in position to receive the first pair of fasteners, and then the hooks I catch the front corners of the frame to hold the rear corners thereof in position to receive the second pair of fasteners. The said hooks are actuated by longitudinally extending bars J, which bars are provided with cam slots $j$ through which bolts extend to cause the said bars to move slightly away from each other when moved in one direction, and slightly toward each other when moved in the other direction. For this purpose the said bars are provided with rolls $j'$ which are engaged by the ordinary reciprocating cams $j^2$, which latter are operated by the pitmen $j^3$, the latter in turn being operated by cams $j^4$ on the shaft $g^2$, as indicated more clearly in Fig. 4. It will be understood, of course, that the different cams and other devices are so timed that they operate in their proper order, and such being the case the cams $j^2$ are moved downward at the proper time to release the bars J, thus allowing the frames to be fed forward, and then the cams $j^2$ are actuated upward to cause the bars J to press the hooks H and I inward, thus bringing the said hooks into position to hold the frames. These bars J are controlled by springs $j^5$, which springs actuate the bars in a direction to cause the cams $j^6$ on said bars J to release the said hooks, so that the latter will be pushed outward by the frames, it being understood that these cams actuate the hooks inward when the bars move in the other direction.

Figure 9:
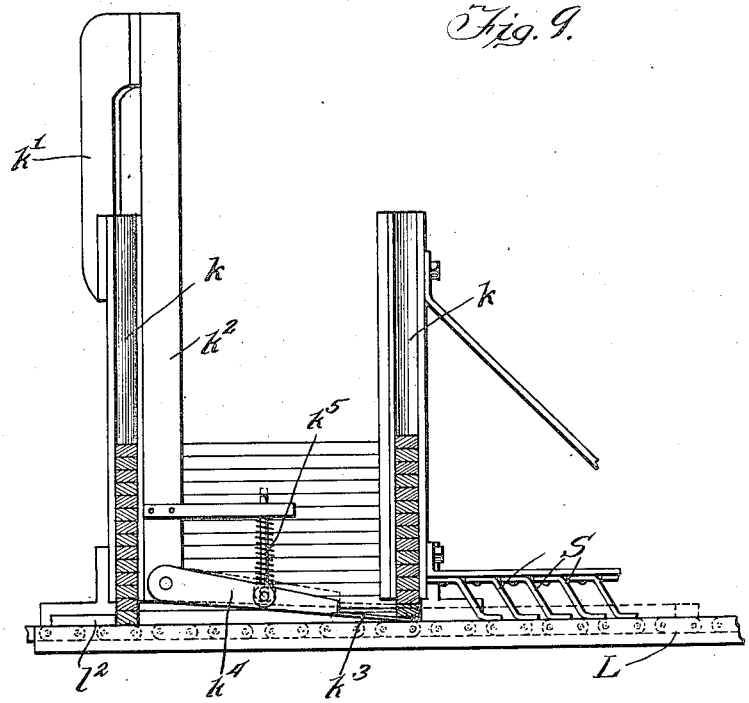
Fig. 9 is an enlarged vertical section of the hopper for automatically feeding the stock in assembled form.
Figure 10:
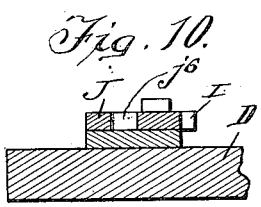
Fig. 10 is a cross section on line 10—10 in Fig. 8.

As a matter of further and special improvement, however, the stock or wood for the said frames is held in the hopper K, which latter is composed of uprights $k$ that engage the corners of the said frames, the latter being held one on top of the other, as shown in Fig. 9. In this condition the four pieces of each frame are held assembled in proper relation, but not fastened together, and are supported by the stock guides above the endless traveling workholder or chains L. These chains run on sprocket wheels $l$ mounted on the transverse shafts $l'$ on the opposite ends of the machine. The said chains are provided with lugs or projections $l^2$ for feeding the stock forward. The said hopper has an overhanging portion $k'$ that supports a couple of upright bars $k^2$ at the back of the hopper—that is to say, just inside of the hopper at the rear thereof. The thin bar $k^3$ is supported on the ends of the pivoted arms $k^4$, which latter are pivotally mounted on the lower ends of the bars $k^2$ and held normally against the stock guides and the said endless traveling work-holder by the springs $k^5$. The stack of front pieces for the frames rests upon the bar $k^3$, as shown in Fig. 9, so that the front pieces of the frame are normally, and while they are in the hopper, a little above the sides and rear cross pieces of the said frames. When a lug or projection $l^2$ engages the rear end of the frame held in the bottom of the hopper, the said frame moves forward along the stock guides until the rear cross piece of the frame strikes the underside of the bar $k^3$, and then the latter raises the entire stack of front cross pieces of the frames, so that they will not fall down or rest upon the moving frame while the rear cross piece is crossing down from below. This prevents any portion of the frame which is being fed from catching on or dislodging the front cross piece of the next frame above. In other words, the stack of front cross pieces for the frames is moved bodily whenever a frame is fed forward, and the feeding of the stock is thus made free and certain.

The shafts $g^2$ and M are geared to the main intermediate shaft N, and the shaft $g^2$ is geared to the main driving shaft O, which latter is provided with a friction clutch P controlled by a hand lever Q, in a manner that will be readily understood. The shafts $g^2$ and M operate the cross heads $a^2$ which actuate the fastener drivers. The shaft M is connected by a sprocket chain R with the shaft $l'$ at the rear or delivery end of the machine, whereby the endless traveling workholder or chain belts L are driven to feed the stock forward below the fastener drivers. There is a suitable slippage or frictional connection $r$ between the sprocket wheel $r'$ and the shaft M, whereby the traveling workholder can stop while the frames are being fastened—that is, while the fasteners are actually being driven. This connection $r$ has a pair of nuts $r^2$ for regulating the pressure of the leather disks $r^3$ against said sprocket. The sprocket is loose on the shaft and said disks are secured to metal disks $r^4$ that are keyed or splined to the shaft. See Fig. 15. It will be seen that the whole machine is controlled by the friction clutch P and the hand lever Q.

When the machine is started, the first frame moves forward until it engages the hooks H, and the fasteners are then inserted in the front corners of the frame, by the heads E and $E^2$, the other heads $E'$ and $E^3$ being caused to miss or skip. Then the said hooks are released and the frame feeds quickly forward until its rear corners are below the heads or fastener drivers $E'$ and $E^3$, its front corners being caught by the hooks I, whereby it is again held stationary to receive the second pair of fasteners in its rear corners. Then the hooks are released and the frame is discharged from the machine, and another frame is automatically fed from the hopper to the hooks H, and the operation is repeated. The front corners of the next frame are fastened by the fasteners driven by the heads E and $E^2$ and the heads $E'$ and $E^3$ are operated to fasten the rear corners of the preceding frame.

The stock is held down during its forward movement to the fastener drivers by the spring feet or pressing devices S, or by any other suitable devices.

Thus the machine comprises a hopper mechanism wherein are assembled the parts of each frame. Each frame is then automatically fed in assembled form. In other words, the stock is not assembled by the traveling work-holder, or after it reaches the said work-holder, but is fed to the workholder in fully assembled condition. For the broader purposes of my invention, therefore, the said fastener drivers can be of any suitable character—that is to say, they can be either nailers or staplers or other fastener drivers, depending upon the particular work to be done and the character of the article to be made. More specifically considered, however, the said fastener drivers are of the kind employed for driving corrugated sheet metal fasteners, each fastener being driven crosswise of the joint at one corner of the frame of wood or other material. The fastener drivers are all operated simultaneously, but they do not all drive fasteners each time they are all operated. When the fastener drivers are all actuated, a pair of fasteners is driven by the front pair of drivers, the rear pair being caused to skip or miss; and then when the rear pair of drivers is operated to insert a pair of fasteners, the front pair of drivers is operated to act on the next frame. Thus the two ends of the frame are not fastened simultaneously, the corners of the front end being fastened first and the rear corners being fastened together afterward. It will be understood that the power transmitting connections and other devices can be so timed in their operation that the feeding of the frames is accomplished in the desired manner—that is to say, the automatic feeding of the materials is fast enough to alternately bring the front and rear corners of the frame into position to receive fasteners, in the manner explained.

It will be understood, of course, that this machine can be used in different ways, depending upon the size and shape of the frames. Referring to Fig. 1, it will be seen that a frame which accurately fits in the hopper K will have its rear corners below the driving heads $E^1$ and $E^3$ when the front corners thereof are held by the hooks I, whereby the said rear corners will be fastened together. If the blocks $l^2$ on the feed chains are near enough together, a second frame will at this time have its front corners held by the hooks H, whereby the said front corners of this second frame will be fastened together at the same time that the rear corners of the first frame are receiving fasteners. The hooks I and H, are, it will be understood, released by the action of the cam $j^4$ immediately after the driving operation, and the friction feed then quickly moves the two frames forward, the second frame being caught by the hooks I, and the third frame being caught by the hooks H, the hooks being pushed inward in the manner previously explained. Under these conditions, the operation of the skipping mechanism shown in Figs. 11 and 12 is not necessary and can be prevented in any suitable manner. Obviously, however, and should the blocks $l^2$ be so wide apart that only one frame can be made at a time, the said skipping mechanism will then become desirable, and will operate in the manner previously described. In other words, when frames are made one at a time, each frame will first engage the hooks H, thereby receiving fasteners for the front corners of the frame, and will then move forward and engage the hooks I, thus receiving the fasteners for the rear corners. Under these conditions the heads $E^1$ and $E^3$ are prevented from driving fasteners while the front corners of the single frame are receiving fasteners below the heads E and $E^2$, and when the frame moves forward the heads $E^1$ and $E^3$ then become operative to drive fasteners and the heads E and $E^2$ are rendered inoperative by the skipping mechanism. Thus, as stated, the machine can obviously be used in different ways, either with or without the skipping mechanism, depending upon the condition, without departing from the spirit of my invention.

I do not limit myself to any particular use of my invention, or to the exact construction shown and described, as the various features, or at least some of them, can be used for making various articles and various changes and modifications can be made without departing from the spirit of my invention, and with this understanding, what I claim as my invention is:

1. In a machine for driving fastening devices, a hopper for holding the stock in a plurality of assembled sets, one set on top of another, a device for lifting the stock at one side of the hopper, a feeding apparatus coöperating therewith, said device being so arranged as to be actuated by the stock being fed from the other side of the hopper, and means for driving fastening devices to secure the stock together.

2. In a machine for driving fastening devices, a hopper for holding the stock, a pivoted device for lifting the stock at one side of the hopper, means reaching down into the hopper to support said pivoted device, a feeding apparatus coöperating therewith, the said device being so arranged as to be actuated by the stock being fed from the other side of the hopper, and means for driving fastening devices to secure the stock together.

3. In a machine for driving fastening devices, a pair of stock guides, hooks on said guides to catch and hold the stock, a pair of movable bars having cams for controlling said hooks, means for actuating said bars, means for feeding the stock along said guides, and means for driving fastening devices to secure the stock together.

4. In a machine for driving fastening devices, a hopper, a chain carrier for feeding the stock from the said hopper, in successive sets, a friction drive for said chain carrier, means for engaging the stock to interrupt the feeding motion of said carrier, and means operating on each set a plurality of times, at successive points in the path of travel thereof, for inserting fastening devices to secure the stock together.

5. In a machine for driving fastening devices, a hopper mechanism for holding the stock in a plurality of assembled sets, means for feeding the sets in assembled form, and a plurality of corrugated sheet metal fastener drivers operating on each set a plurality of times at successive points in the path of travel thereof for inserting corrugated fasteners across the joints of the corners of each set.

6. In a machine for driving fastening devices, a mechanism wherein are assembled a plurality of sets of parts to be fastened together, means for automatically feeding the sets in assembled form, and means for driving fastening devices to secure the parts of each set together, the said machine operating on the forward end of each set, and afterward on the rear end thereof, at different points in the path of travel of said article, the fastener drivers being disposed in such position that the second fasteners are each driven at an angle opposite to that of the corresponding first fastener in line therewith.

7. In a machine for driving fastening devices, a mechanism wherein are assembled a plurality of sets of parts to be fastened together, each set in rectangular form, means for automatically feeding the sets, and means for driving fastening devices at the corners of the sets to secure the parts together, the said machine operating on the forward end of each set and afterward on the rear end thereof, at different points in the path of travel of said article, the fastener drivers being disposed in such position that the second fasteners are each driven at an angle opposite to that of the corresponding first fastener in line therewith.

8. In a machine for driving fastening devices, a hopper mechanism for holding a plurality of sets of parts to be fastened together, one set on top of the other, an endless traveling carrier for automatically feeding the sets from the bottom of said hopper mechanism, and means for driving fastening devices to secure the parts of each set together, the said machine operating on the forward end of each complete article made and afterward on the rear end thereof, at different points in the path of travel of said article, the fastener drivers being disposed in such position that the second fasteners are each driven at an angle opposite to that of the corresponding first fastener in line therewith.

9. In a machine for driving fastening devices, mechanism for automatically feeding the parts to be fastened together, and means for inserting corrugated sheet metal fasteners in said parts to secure the same together, the said machine operating on the forward end of each complete article made and afterward on the rear end thereof, at different points in the path of travel of said article, the fastener drivers being disposed in such position that the second fasteners are each driven at an angle opposite to that of the corresponding first fastener in line therewith.

10. In a machine for driving fastening devices, a hopper mechanism wherein are assembled a plurality of sets of parts to be fastened together, means for automatically feeding the sets from the said hopper mechanism, and means for inserting corrugated sheet metal fasteners in said parts to fasten the same together, the said machine operating on the forward end of each complete article made and afterward on the rear end thereof, at different points in the path of travel of said article, the fastener drivers being disposed in such position that the second fasteners are each driven at an angle opposite to that of the corresponding first fastener in line therewith.

11. In a machine for driving fastening devices, guides for the stock, means for moving the stock along the guides, and means for inserting corrugated sheet metal fasteners to secure the stock together, the said machine operating on the forward end of each complete article made and afterward on the rear end thereof, at different points in the path of travel of said article, the fastener drivers being disposed in such position that the second fasteners are each driven at an angle opposite to that of the corresponding first fastener in line therewith.

12. In a machine for driving fastening devices, mechanism wherein the pieces of stock are held in assembled relation, means for receiving and feeding the stock in assembled form, and means for inserting fastening devices to secure the stock together, the said machine operating on the forward end of each complete article made and afterward on the rear end thereof, at different points in the path of travel of said article, the fastener drivers being disposed in such position that the second fasteners are each driven at an angle opposite to that of the corresponding first fastener in line therewith.

13. In a machine for driving fastening devices, means wherein are held a plurality of pieces of stock in sets, means for receiving and feeding the sets in assembled form, mechanism for driving fastening devices to secure the stock together, and a skipping device for said mechanism, the said machine operating on the forward end of 14. In a machine for driving fastening devices, a hopper for holding the stock in a plurality of assembled sets, one set on top of the other, a device for lifting the stock at one side of the hopper, feeding apparatus whereby said device is actuated by the stock from the other side of the hopper, means for driving fastening devices to secure the stock together, and means for engaging the stock to interrupt the feeding motion and the operation of said device during the driving operation.

15. In a machine for driving fastening devices, a hopper for holding the stock, a pivoted device for lifting the stock at one side of the hopper, means reaching down into the hopper to support said pivoted device, a feeding apparatus whereby the said device is actuated by the stock from the other side of the hopper, means for driving fastening devices to secure the stock together, and means for engaging the stock to interrupt the feeding motion and the operation of said device during the driving operation.

16. In a machine for driving fastening devices, a pair of stock guides, hooks on said guides to catch and hold the stock, a pair of movable bars having beveled portions for controlling said hooks, means for actuating said bars, means for feeding the stock along said guides, and means for driving fastening devices to secure the stock together, the said machine operating on the forward end of each complete article made and afterward on the rear end thereof.

17. In a machine for driving fastening devices, a hopper, a chain carrier for feeding the stock from the said hopper, a continuously acting friction drive for said chain carrier, means for catching the stock to stop the feeding motion of said carrier, and means for inserting fastening devices to secure the stock together, the said machine operating on the forward end of each complete article made and afterward on the rear end thereof, at different points in the path of travel of said article.

18. In a machine for driving fastening devices, a hopper mechanism for holding the stock in a plurality of assembled sets, means for feeding the sets in assembled form, and a plurality of corrugated sheet metal fastener drivers for inserting corrugated fasteners to secure the members of each set together, the said machine operating on the forward end of each complete article made and afterward on the rear end thereof, at different points in the path of travel of said article, the fastener drivers being disposed in such position that the second fasteners are each driven at an angle opposite to that of the corresponding first fastener in line therewith.

19. In a machine for driving fasteners, a feeding apparatus, a hopper mechanism for delivering the stock in completely assembled form to said feeding apparatus, said apparatus provided with means for taking the assembled stock from the bottom of said hopper, and means for inserting fasteners, the said machine operating on the forward end of each complete article made and afterward on the rear end thereof, at different points in the path of travel of said article, the fastener drivers being disposed in such position that the second fasteners are each driven at an angle opposite to that of the corresponding first fastener in line therewith.

20. In a machine for driving fastening devices, a traveling work-holder, a friction feed for said work-holder, means for stopping the work-holder, causing said feed to slip, and means for inserting a fastening device while the work-holder is stationary, the said machine operating on the forward end of each complete article made and afterward on the rear end thereof, at different points in the path of travel of said article.

21. In a machine for driving fastening devices, a traveling work-holder, a friction feed for said work-holder, means for stopping the work-holder, causing said feed to slip, and means for inserting a fastening device while the work-holder is stationary, said work-holder comprising a plurality of endless sprocket chains, the said machine operating on the forward end of each complete article made and afterward on the rear end thereof, at different points in the path of travel of said article.

22. In a machine for driving fastening devices, a mechanism wherein are assembled a plurality of sets of parts, means for automatically feeding the sets in assembled form, and means for driving fastening devices to secure the parts of each set together, there being one gang of fastener drivers for operating on the forward end of each complete article made, and a second gang for operating on the rear end thereof, disposed in such position that the second fasteners are each driven at an angle opposite to that of the corresponding first fastener in line therewith.

23. In a machine for driving fastening devices, a mechanism wherein are assembled a plurality of sets of parts, each set in rectangular form, means for automatically feeding the sets, and means for driving fastening devices at the corners of the sets to secure the parts together, there being one gang of fastener drivers for operating on the forward end of each complete article made, and a second gang for operating on the rear end thereof, disposed in such position that the second fasteners are each driven at an angle opposite to that of the corresponding first fastener in line therewith.

24. In a machine for driving fastening devices, a hopper mechanism for holding a plurality of sets of parts, one set on top of the other, an endless traveling carrier for automatically feeding the sets from the bottom of said hopper mechanism, and means for driving fastening devices to secure the parts of each set together, there being one gang of fastener drivers for operating on the forward end of each complete article made, and a second gang for operating on the rear end thereof, disposed in such position that the second fasteners are each driven at an angle opposite to that of the corresponding first fastener in line therewith.

25. In a machine for driving fastening devices, mechanism for automatically feeding the parts, and means for inserting corrugated sheet metal fasteners in said parts to secure the same together, there being one gang of fastener drivers for operating on the forward end of each complete article made, and a second gang for operating on the rear end thereof, disposed in such position that the second fasteners are each driven at an angle opposite to that of the corresponding first fastener in line therewith.

26. In a machine for driving fastening devices, a hopper mechanism wherein are assembled a plurality of sets of parts, means for automatically feeding the sets from the said hopper mechanism, and means for inserting corrugated sheet metal fasteners in said parts to fasten the same together, there being one gang of fastener drivers for operating on the forward end of each complete article made, and a second gang for operating on the rear end thereof, disposed in such position that the second fasteners are each driven at an angle opposite to that of the corresponding first fastener in line therewith.

27. In a machine for driving fastening devices, guides for the stock, means for moving the stock along the guides, and means for inserting corrugated sheet metal fasteners to secure the stock together, there being one gang of fastener drivers for operating on the forward end of each complete article made, and a second gang for operating on the rear end thereof, disposed in such position that the second fasteners are each driven at an angle opposite to that of the corresponding first fastener in line therewith.

28. In a machine for driving fastening devices, mechanism wherein are assembled the pieces of stock, means for receiving and feeding the stock in assembled form, and means for inserting fastening devices to secure the stock together, there being one gang of fastener devices for operating on the forward end of each complete article made, and a second gang for operating on the rear end thereof, disposed in such position that the second fasteners are each driven at an angle opposite to that of the corresponding first fastener in line therewith.

29. In a machine for driving fastening devices, means wherein are assembled a plurality of pieces of stock in sets, means for receiving and feeding the sets in assembled form, means for driving fastening devices to secure the stock together, and a skipping device for said mechanism, there being one gang of fastener devices for operating on the forward end of each complete article made, and a second gang for operating on the rear end thereof, arranged so that the second operation occurs after the article passes the first gang of fastener drivers.

30. In a machine for driving fastening devices, a hopper for holding the stock in a plurality of assembled sets, one set on top of the other, a device for lifting the stock at one side of the hopper, feeding apparatus whereby said device is actuated by the stock from the other side of the hopper, and means for driving fastening devices to secure the stock together, said hopper being constructed to hold the abutting portions of the stock in contact at the corners of the article formed thereby.

31. In a machine for driving fastening devices, a hopper for holding the stock, a pivoted device for lifting the stock at one side of the hopper, means reaching down into the hopper to support said pivoted device, a feeding apparatus whereby the said device is actuated by the stock from the other side of the hopper, and means for driving fastening devices to secure the stock together, said hopper being constructed to hold the abutting portions of the stock in contact at the corners of the article formed thereby.

32. In a machine for driving fastening devices, a pair of stock guides, hooks on said guides to catch and hold the stock, a pair of movable bars for controlling said hooks, means for actuating said bars, means for feeding the stock along said guides, and means for driving fastening devices to secure the stock together, there being one gang of fastener drivers for operating on the forward end of each complete article made, and a second gang for operating on the rear end thereof.

33. In a machine for driving fastening devices, a hopper, a chain carrier for feeding the stock from the said hopper, a continuously acting friction drive for said chain carrier, means for catching the stock to stop the feeding motion of said carrier, and means for inserting fastening devices to secure the stock together, there being one gang of fastener drivers for operating on the forward end of each complete article made, and a second gang for operating on the rear end thereof, disposed in position whereby the second operation occurs after the article passes the first gang of fastener drivers.

34. In a machine for driving fastening devices, a hopper mechanism for holding the stock in a plurality of assembled sets, means for feeding the sets in assembled form, devices for inserting corrugated fasteners to secure the corners of each set together, there being one gang of fastener drivers for operating on the forward end of each complete article made, and a second gang for operating on the rear end thereof, disposed in such position that the second fasteners are each driven at an angle opposite to that of the corresponding first fastener in line therewith.

35. In a machine for driving fastening devices, a feeding apparatus, a hopper mechanism for delivering the stock in completely assembled form to said feeding apparatus, said apparatus provided with means for taking the assembled stock from the bottom of said hopper, and means for inserting fasteners, there being one gang of fastener drivers for operating on the forward end of each complete article made, and a second gang for operating on the rear end thereof, disposed in such position that the second fasteners are each driven at an angle opposite to that of the corresponding first fastener in line therewith.

36. In a machine for driving fastening devices, a traveling work-holder, a friction feed for said work-holder, means for stopping the work-holder, causing said feed to slip, and means for inserting a fastening device while the work-holder is stationary, there being one gang of fastener drivers for operating on the forward end of each complete article made, and a second gang for operating on the rear end thereof, arranged so that the second operation occurs after the article passes the first gang of fastener drivers.

37. In a machine for driving fastening devices, a traveling work-holder, a friction feed for said work-holder, means for stopping the work-holder, causing said feed to slip, and means for inserting a fastening device while the work-holder is stationary, said work-holder comprising a plurality of endless sprocket chains: there being one gang of fastener drivers for operating on the forward end of each complete article made, and a second gang for operating on the rear end thereof, arranged so that the second operation occurs after the article passes the first gang of fastener devices.

38. In a machine for driving fastening devices, a mechanism wherein are assembled a plurality of sets of parts, means for automatically feeding the sets in assembled form, means for driving fastening devices to secure the parts of each set together, the said elements being so arranged as to require a plurality of successive feeding and fastening operations for each complete article made by the said machine, said fastening operations alternating at different points in the path of travel of said article, and means for engaging the forward end of said article to hold it in successive fastening positions.

39. In a machine for driving fastening devices, a mechanism wherein are assembled a plurality of sets of parts, each set in rectangular form, means for automatically feeding the sets, means for driving fastening devices at the corners of the sets to secure the parts together, the said elements being so arranged as to require a plurality of successive feeding and fastening operations for each complete article made by the said machine, said fastening operations alternating at different points in the path of travel of said article, and means for engaging the forward end of said article to hold it in successive fastening positions.

40. In a machine for driving fastening devices, a hopper mechanism for holding a plurality of sets of parts, one set on top of the other, an endless traveling carrier for automatically feeding the sets from the bottom of said hopper mechanism, means for driving fastening devices to secure the parts of each set together, the said elements being so arranged as to require a plurality of successive feeding and fastening operations for each complete article made by the said machine, said fastening operations alternating at different points in the path of travel of said article, and means for engaging the forward end of said article to hold it in successive fastening positions.

41. In a machine for driving fastening devices, mechanism for automatically feeding the parts, means for inserting corrugated sheet metal fasteners in said parts to secure the same together, the said elements being so arranged as to require a plurality of successive feeding and fastening operations for each complete article made by the said machine, said fastening operations alternating at different points in the path of travel of said article, and means for engaging the forward end of said article to hold it in successive fastening positions.

42. In a machine for driving devices, a hopper mechanism wherein are assembled a plurality of sets of parts, means for automatically feeding the sets from the said hopper mechanism, means for inserting corrugated sheet metal fasteners in said parts to fasten the same together, the said elements being so arranged as to require a plurality of successive feeding and fastening operations for each complete article made by the said machine, said fastening operations alternating at different points in the path of travel of said article, and means for engaging the forward end of said article to hold it in successive fastening positions.

43. In a machine for driving fastening devices, guides for the stock, means for moving the stock along the guides, means for inserting corrugated sheet metal fasteners to secure the stock together, the said elements being so arranged as to require a plurality of successive feeding and fastening operations for each complete article made by the said machine, said fastening operations alternating at different points in the path of travel of said article, and means for engaging the forward end of said article to hold it in successive fastening positions.

44. In a machine for driving fastening devices, mechanism wherein are assembled, the pieces of stock, means for receiving and feeding the stock in assembled form, means for inserting fastening devices to secure the stock together, the said elements being so arranged as to require a plurality of successive feeding and fastening operations for each complete article made by the said machine, said fastening operations alternating at different points in the path of travel of said article, and means for engaging the forward end of said article to hold it in successive fastening positions.

45. In a machine for driving fastening devices, means wherein are assembled a plurality of pieces of stock in sets, means for receiving and feeding the sets in assembled form, means for driving fastening devices to secure the stock together, and a skipping device for said mechanism, the said elements being so arranged as to require a plurality of successive feeding and fastening operations for each complete article made by the said machine, said fastening operations alternating at different points in the path of travel of said article.

46. In a machine for driving fastening devices, a hopper for holding the stock in a plurality of assembled sets, one set on top of the other, a device for lifting the stock at one side of the hopper, feeding apparatus for the stock whereby the said device is actuated by the stock being fed from the other side of the hopper, a spring for said device, and means for driving fastening devices to secure the stock together.

47. In a machine for driving fastening devices, a hopper for holding the stock, a pivoted device for lifting the stock at one side of the hopper, means reaching down into the hopper to support said pivoted device, a feeding apparatus for the stock whereby the said device is actuated by the stock from the other side of the hopper, a spring for said device, and means for driving fastening devices to secure the stock together.

48. In a machine for driving fastening devices, a pair of stock guides, hooks on said guides to catch and hold the stock in successive and different positions, a pair of movable bars for controlling said hooks, means for actuating said bars, means for feeding the stock along said guides, and means for driving fastening devices to secure the stock together, the said elements being so arranged as to require a plurality of successive feeding and fastening operations for each complete article made by the said machine.

49. In a machine for driving fastening devices, a hopper, a chain carrier for feeding the stock from the said hopper, a continuously acting friction drive for said chain carrier, means for catching the stock to stop the feeding motion of said carrier, and means for inserting fastening devices to secure the stock together, the said elements being so arranged as to require a plurality of successive feeding and fastening operations for each complete article made by the said machine, said fastening operations alternating at different points in the path of travel of said articles.

50. In a machine for driving fastening devices, a hopper mechanism for holding the stock in a plurality of assembled sets, means for feeding the sets in assembled form, a plurality of corrugated sheet metal fastener drivers for inserting corrugated fasteners to secure the corners of each set together, the said elements being so arranged as to require a plurality of successive feeding and fastening operations for each complete article made by the said machine, said fastening operations alternating at different points in the path of travel of said article, and means for catching and holding said article in the different positions necessary for said fastening operations.

51. In a machine for driving fasteners, a feeding apparatus, a hopper mechanism for delivering the stock in completely assembled form to said feeding apparatus, said apparatus provided with means for taking the assembled stock from the bottom of said hopper, means for inserting fasteners, the said elements being so arranged as to require a plurality of successive feeding and fastening operations for each complete article made by the said machine, said fastening operations alternating at different points in the path of travel of said article, and means for catching and holding said article in the different positions necessary for said fastening operations.

52. In a machine for driving fastening devices, a traveling work-holder, a friction feed for said work-holder, means for stopping the work-holder, causing said feed to slip, and means for inserting a fastening device while the work-holder is stationary, the said elements being so arranged as to require a plurality of successive feeding and fastening operations for each complete article made by the said machine, said fastening operations alternating at different points in the path of travel of said article.

53. In a machine for driving fastening devices, a traveling work-holder, a friction feed for said work-holder, means for stopping the work-holder, causing said feed to slip, and means for inserting a fastening device while the work-holder is stationary, said work-holder comprising a plurality of endless sprocket chains, the said elements being so arranged as to require a plurality of successive feeding and fastening operations for each complete article made by the said machine, said fastening operations alternating at different points in the path of travel of said article.

54. A machine for feeding and fastening pieces of wood or other materials together, comprising fastener driving means, a plurality of endless belts for feeding the materials to said means and arranged to propel the fastened materials away from said fastener driving means, a continuously acting friction drive for said belts, and mechanism coöperating with said friction drive for causing said belts to have an intermittent feeding movement.

55. A machine for feeding and fastening pieces of wood or other materials together, comprising fastener driving means, a plurality of endless belts for feeding the materials to said means and arranged to propel the fastened materials away from said fastener driving means, a continuously acting friction drive for said belts, and mechanism coöperating with said friction drive for causing said belts to have an intermittent feeding movement, said mechanism including devices for engaging the materials.

56. A machine for feeding and fastening pieces of wood or other materials together, comprising fastener driving means, a plurality of endless belts for feeding the materials to said means and arranged to propel the fastened materials away from said fastener driving means, a continuously acting friction drive for said belts, and mechanism coöperating with said friction drive for causing said belts to have an intermittent feeding movement, said mechanism including devices disposed in position to engage the materials at opposite sides of the machine, said devices being movable toward and away from each other in the plane of the advancing materials.

57. A machine for feeding and fastening pieces of wood or other materials together, comprising fastener driving means, a plurality of endless belts for feeding the materials to said means and arranged to propel the fastened materials away from said fastener driving means, a continuously acting friction drive for said belts, and mechanism coöperating with said friction drive for causing said belts to have an intermittent feeding movement, said mechanism including a pair of devices pivoted to swing toward and away from each other about vertical axes, disposed in the plane of the advancing materials.

58. A machine for feeding and fastening pieces of wood or other materials together, comprising fastener driving means, a plurality of endless belts for feeding the materials to said means and arranged to propel the fastened materials away from said fastener driving means, a continuously acting friction drive for said belts, and mechanism coöperating with said friction drive for causing said belts to have an intermittent feeding movement, said belts having engaging portions fixed thereon for propelling the materials forward, and guides for the materials, disposed at opposite sides of the machine.

59. A machine for feeding and fastening pieces of wood or other materials together, comprising fastener driving means, a plurality of endless belts for feeding the materials to said means and arranged to propel the fastened materials away from said fastener driving means, a continuously acting friction drive for said belts, and mechanism coöperating with said friction drive for causing said belts to have an intermittent feeding movement, said means having skipping devices for preventing the driving of fasteners at intervals in the operation of said machine.

Signed by me at St. Joseph, Mich., this 18th day of January, 1911.

EDWARD CRAIG.

Witnesses:
W. H. RAY,
J. N. GILLMAN.